(12) United States Patent
Gent

(10) Patent No.: US 10,948,277 B2
(45) Date of Patent: Mar. 16, 2021

(54) CARTRIDGE AND CHAMBER GAUGES

(71) Applicant: Jeffrey Howard Gent, Brownsville, OR (US)

(72) Inventor: Jeffrey Howard Gent, Brownsville, OR (US)

( * ) Notice: Subject to any disclaimer, the term of this patent is extended or adjusted under 35 U.S.C. 154(b) by 241 days.

(21) Appl. No.: 16/371,021

(22) Filed: Mar. 31, 2019

(65) Prior Publication Data

US 2020/0309501 A1    Oct. 1, 2020

(51) Int. Cl.
*G01B 5/12*    (2006.01)

(52) U.S. Cl.
CPC ..................... *G01B 5/12* (2013.01)

(58) Field of Classification Search
CPC .................. G01B 5/12; G01B 5/18
USPC .......................................... 33/506
See application file for complete search history.

(56) References Cited

U.S. PATENT DOCUMENTS

| | | | | |
|---|---|---|---|---|
| 2,799,092 A * | 7/1957 | Abramson | ............... | G01B 5/12 33/542 |
| 3,510,951 A * | 5/1970 | Dow | ........................ | G01B 3/50 33/506 |
| 3,821,854 A * | 7/1974 | Koch | ........................ | G01B 3/18 33/544 |
| 4,090,305 A * | 5/1978 | Cassidy | ..................... | F41G 1/54 33/391 |
| 4,918,825 A * | 4/1990 | Lesh | ........................ | F42B 35/02 33/506 |
| 5,396,708 A * | 3/1995 | Whitley | .................... | F41G 3/323 279/2.02 |
| 10,473,444 B1 * | 11/2019 | Gent | ......................... | F42B 33/10 |
| 10,655,944 B1 * | 5/2020 | Gent | ...................... | F42B 33/002 |
| 2006/0248739 A1 * | 11/2006 | Cauley | ..................... | F41A 31/00 33/506 |
| 2014/0196300 A1 * | 7/2014 | Williamson, IV | ....... | G01B 3/28 33/701 |
| 2015/0107126 A1 * | 4/2015 | Sluder, III | ............... | G01B 3/28 33/506 |

* cited by examiner

*Primary Examiner* — George B Bennett

(57) ABSTRACT

A gauge with two probes measures a rifle chamber to determine the distance from the center of the shoulder to the start of the bore. A gauge with two holes measures a loaded cartridge to determine the distance from the center of the shoulder to the place on the bullet where the cross sectional diameter is the same as the bore of the rifle. The difference between these two measurements is bullet jump: the distance the bullet will move, upon firing, before it engages the rifling of the barrel. These same tools, properly sized, also provide a unique and convenient means for determining the cone angle of any conical surface.

3 Claims, 5 Drawing Sheets

FIG. 8 $\theta = 2 \tan^{-1}\left(\dfrac{D2 - D1}{2L}\right)$

CARTRIDGE AND CHAMBER GAUGES

CROSS-REFERENCE TO RELATED APPLICATIONS

Not Applicable

BACKGROUND OF THE INVENTION

This invention pertains to gunsmithing and the making of ammunition cartridges for rifles such as those used by hunters, military, and competitive shooters.

Rifle chamber and ammunition cartridge designations are standardized by the Sporting Arms and Ammunition Manufacturer's Institute (SAAMI). ANSI maintains a corresponding standard Z299.4. These standards define, among other things, the physical dimensions of the cartridge and chamber for each cartridge designation by way of a mechanical drawing specifying the dimensions and tolerances for each feature. These dimensions and tolerances dictate how the cartridge will fit into the chamber, take into account changes in the cartridge dimensions during firing, and also account for normal manufacturing variation to ensure that all commercial ammunition will function in all commercial rifles. Allowable variations are small but they can have a significant effect on accuracy because they may alter the way a bullet enters the barrel which affects how it leaves the barrel which affects downrange accuracy. One of the motivations for hand loading ammunition is to take advantage of the ability to adjust the final dimensions of the cartridge to closely match the chamber of a particular rifle and to also decrease the variation from cartridge to cartridge thereby increasing accuracy and consistency.

Ammunition cartridges are assembled from a case, a primer, powder, and a bullet and are put into several broad classes based on the type of case that is used: rimmed, rimless, and belted being the most common types. Each of these three types of cases uses a different physical feature on the case to locate the case inside the chamber, which is commonly called 'headspacing' but within the SAAMI specification is called 'breeching'. Rimmed and belted cases are breeched by ("headspace off of" is the common terminology) the rim or belt. A rimmed cartridge is illustrated in FIG. 1, the rim (1) being a raised ring around the head of the case. Belted cases are very similar. A rimless cartridge is illustrated in FIG. 2, shown inside a chamber (3a) of a barrel (3). A cartridge with a rimless case (2) is breeched by ("headspace off of") the shoulder (2c), the conical transition between the larger cylindrical body (2b) of the case (2), which holds the powder, and the smaller cylindrical neck (2d), which holds the bullet (4). Not discernible in FIG. 2 is that the SAMMI specifications for shoulder breeching cartridges and chambers maintain a very small gap between the cartridge case (2b) and the chamber (3a); the only contact between the two is between the case shoulder (2c) and the chamber shoulder (3b). This is a difference that the prior art has not addressed. All of the different reloading dies, overall-length-gauges, bullet comparators, other tools, and the techniques for using them that are contained in the prior art and commercially available make no differentiation between these different case types, essentially treating all of them as if they were of the rimmed type where all critical dimensions are referenced from the head (2a) of the case (2) and alignment is controlled by adjustments to the body (2b) and neck (2d) of the case. However, for rimless cases critical dimensions and alignment should be referenced to the shoulder (2c).

Among the issues that the existing technology is not handling correctly, for rimless cases, is the way that the chamber and ammunition is measured. This is illustrated in FIGS. 2 and 2a (which is an enlarged view of part of FIG. 2. The problem with present technology isn't merely poor measurement accuracy; it's a problem of measuring the wrong thing. Present technology takes all measurements from the head (2a) of the case (2). However, because shoulder breeching cartridges use the shoulder to locate the cartridge within the chamber, the proper technique is to reference measurements to what is commonly known as the 'datum line' (5a), which is in the middle of the shoulder (2c). The datum line (5a) is not a visible feature on the case but is the line that defines the median diameter of the case shoulder (2c) in the Cartridge and Chamber Drawings for shoulder breeching cartridges (308 Winchester for example) in the SAAMI specification; this is not formally named the datum line, but this is the term commonly used for this line in the relevant literature. The shoulder (2c) is a truncated cone defined by its median diameter (the datum line (5a)) and the shoulder angle (5d). Since no means presently exists to measure an ammunition cartridge (2 and 4) using the shoulder datum line (5a) as a reference point this invention was developed.

Another reference point for measurements of the cartridge is on the bullet (4). Existing tools and methods measure from either the tip (4a) or the ogive (5b), which is where the cylindrical body ends and the tapered point begins. Measuring from these two locations is problematic. Typically, manufacturing variation at the tip (4a) is very large so any measurement taken from there is unreliable. Also, the tip (4a) doesn't contact anything so it doesn't matter where it is. The cross sectional diameter of the bullet (4) at the ogive (5b) is the same diameter as the cylindrical base that is inside the case neck (2d), which makes this a difficult place to locate precisely because almost half the bullet has the same diameter. The ogive (5b) is also typically very close to the end of the neck (2d) and may be inside the neck (2d) for a deeply seated or highly tapered bullet (4), both furthering the difficulty in using this as a measurement reference.

An alternative place on the bullet (4) to use as a measurement reference is where the cross sectional diameter is the same as the diameter of the bore (3d) of the barrel (3). There is only one place on the bullet (4) with this diameter so it's very easy to precisely define and that place is fully on the taper of the bullet's point so it's also easier to locate precisely; this place is illustrated in FIGS. 2 and 2a as item 5c and referred to below as the 'bullet datum'. Measurements using the bullet datum (5c) as a reference will be more accurate than measurements referenced to the ogive (5b) or the tip (4a). Since no means presently exists to measure an ammunition cartridge using the bullet datum (5c) as a reference this invention was developed.

The SAMMI specification also includes a datum line for the chamber (6a) which has the same value for the median diameter of the chamber shoulder (3b) as the median diameter of the cartridge shoulder at the datum (5a); therefore the two datum lines must be aligned when the case (2) is properly positioned in the chamber (3a). This means that these datum lines are where the SAMMI specification defines the point of contact between cartridge (2 and 4) and chamber (3a) to be. Therefore, in order to properly compare measurements of the cartridge (2 and 4) to the chamber (3a) it is necessary to use the chamber shoulder datum (6a) as the reference.

The motivation for taking these measurements is to gain control of bullet jump, which is the distance that the bullet (4) moves before it engages the rifling grooves ((3e) through (3h) of FIG. 2b) in the bore (3d) of the barrel (3). FIG. 2a is an enlarged view of the region in FIG. 2 just in front of the case neck (2d) which is often called the freebore region because there are no rifling grooves in this area. The rifling grooves ((3e) through (3h)) begin with a shallow short taper called the ramp (3c) that begins at item 6b where the diameter is slightly larger than the ogive (5b) diameter (which is the same as the groove diameter (6e)) and ends at item 6c where the diameter is the bore diameter (6d), which is the same diameter as the bullet datum (5c). Therefore, initial contact between the bullet (4) and the rifling grooves ((3e) through (3h)) will occur when the region of the bullet between the ogive (5b) and bullet datum (5c) contacts the ramp (3c) between item 6b and item 6c. The distance the bullet moves before this occurs is bullet jump. Controlling bullet jump therefore requires measuring the distance between the datum line of the chamber shoulder (6a) and the ramp (3c) and then assembling a cartridge with tools that predictably set the distance between the case shoulder datum (5a) and the bullet datum (5c); which requires being able to measure the distance between the case shoulder datum (5a) and the bullet datum (5c).

Present technology sets the bullet seating depth by holding the distance between the head of the case (2a) and the bullet tip (4a) constant. This distance is the sum of the distance between the head of the case (2a) and the shoulder datum (5a) and the distance between the shoulder datum (5a) and the bullet tip (4a). Variation normally occurs for various reasons in the length of the case body (2b) between the head of the case (2a) and the shoulder datum (5a), which, because the distance between the head (2a) and the tip (4a) is held constant, must result in variations in the distance between the shoulder datum (5a) and the bullet tip (4a); which must then result in variation in bullet jump for shoulder breeching cartridges. For the same reason, normally existing variation in the distance between the bullet datum (5a) and tip (4a) will result in variation in bullet jump. Additionally, the distance between the bullet datum (5c) and the tip (4a) changes a great deal between different types of bullets, therefore a great deal of variation in bullet jump can occur when changing bullet types.

Present technology does not provide the means for measuring any of these features nor any means for controlling bullet jump in shoulder breeching cartridges so I have developed a set of cartridge reloading tools similar to existing reloading tools but designed specifically for shoulder breeching rifle cartridges. This includes tools for measuring the cartridge and chamber properly, a case hone/trimmer, a neck sizing die, and a bullet seating die; each of which is the subject of a separate invention disclosure. This disclosure is for the measurement tools.

BRIEF SUMMARY OF THE INVENTION

The object of this invention is to provide a set of gauges and a method of using them for taking precise measurements of shoulder breeching rifle cartridges and chambers in order to control bullet jump. Two gauges, with variants, are disclosed. A twin probe gauge is used to measure freebore, which is the distance between the datum line through the shoulder of the chamber and the ramp in the rifling. A twin bore gauge is used to measure the bullet seating depth by measuring the distance between the datum line through the shoulder of the cartridge case and the part of the bullet which will contact the ramp in the rifling. The difference between these two measurements is bullet jump.

There is an application for these gauges outside the fields of gunsmithing and reloading. These gauges, appropriately sized, can also be conveniently utilized to determine the cone angle of any interior or exterior conical surface. It appears that machinists typically take these types of measurements in a very laborious manner. Therefore machinists will likely find these gauges to be of great utility so this application of these gauges is described and claimed as well.

BRIEF DESCRIPTION OF THE SEVERAL VIEWS OF THE DRAWING

Drawings have been included that describe the problem to be solved as well as the invention that solves the problem. The SAMMI specification Cartridge and Chamber Drawings defines a large number of cartridge variants that span a large range of sizes. The drawings here therefore can only present a generic shoulder breeching cartridge. The rifles that use all of these different cartridges also span a very large range of sizes and shapes but they will all have a similar chamber. Therefore the drawings here can only present a generic shoulder breeching chamber and barrel. The gauges that have been invented will need to be made in a large range of sizes to match the large range of cartridges and rifles. Therefore the drawings presenting the invented gauges are also in a generic form and are not to scale. The drawings typically present the subject in a sectional profile view. References include particular geometrical elements (diameters and angles) as well as particular items to support the discussion and claims, typically in dashed lines. The invented gauges are typically made of steel and brass.

FIG. 1 is a rimmed cartridge, the rim (1) being a raised ring around the head.

FIG. 2 illustrates a cartridge within a chamber and the beginning section of the bore. While these drawings are not truly to scale, FIG. 2 presents geometry similar to that of the very popular 308 Winchester cartridge and chamber. Therefore, important details such as the rifling grooves and ramp (3c) are not readily seen because they are in fact very small so this region is enlarged in FIG. 2a. Also, the actual gaps between the cartridge and the chamber are much smaller than is illustrated. The SAMMI Cartridge and Chamber drawings should be referred to for the actual geometry, which varies for each cartridge designation.

FIG. 2b illustrates a cross section of the barrel after the ramp. Again, the proportions are similar to the 308 Winchester but this is a very generic drawing. There are many different rifling groove profiles; presented here is a rectangular profile. The number of rifling grooves also varies; here four grooves are indicated ((3e) through (3h)). The bore diameter (6d) is the diameter at the top of the ridges between the grooves. The groove diameter (6e) is the diameter at the bottom of the grooves.

FIG. 8 provides the equation needed for the measurement illustrated in FIG. 7.

FIG. 10 provides an additional equation needed for the measurement illustrated in FIG. 9.

DETAILED DESCRIPTION OF THE INVENTION

Figure 1:
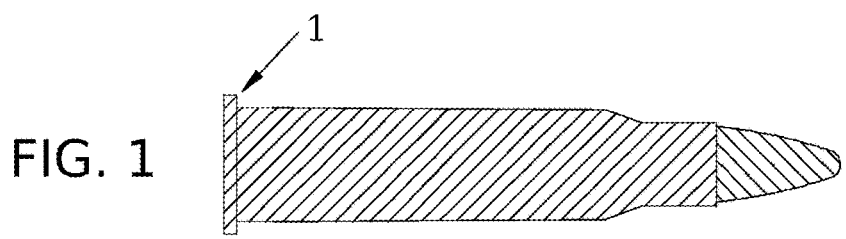
FIGS. 1 through 2b present the details of the problem to be solved and were discussed above.
Figure 2:
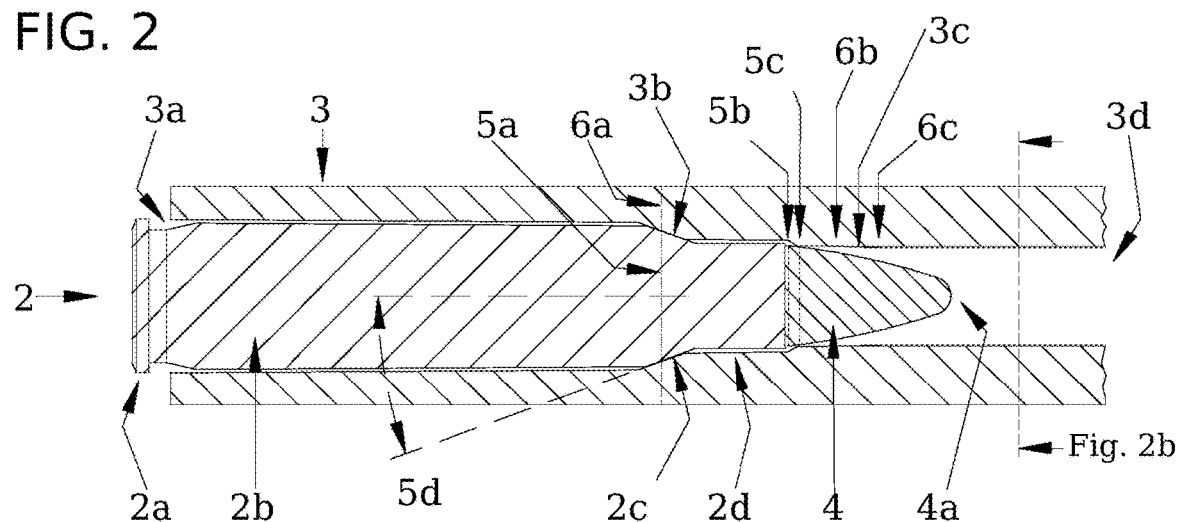
Figure 2A:
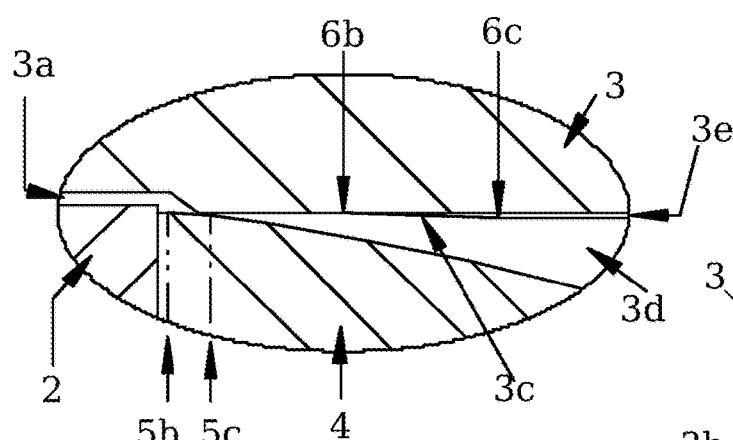
FIG. 2a illustrates an enlarged view of the freebore region of FIG. 2.
Figure 2B:
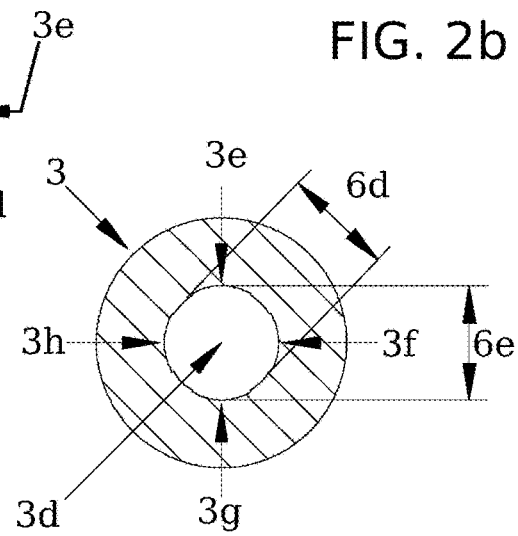
Figure 3:
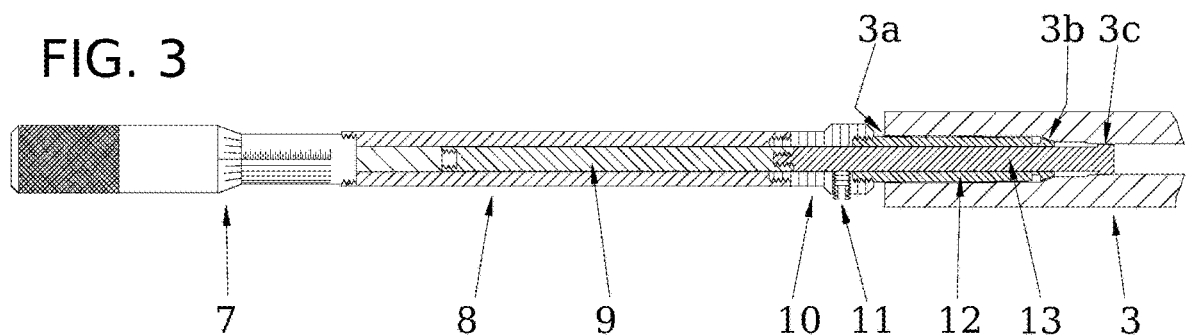
FIG. 3 illustrates the preferred embodiment of the twin probe gauge positioned inside a chamber. The micrometer head (7) is an ubiquitous item having typical internals so it is shown in profile view. The rest of the drawing is a section view to show the internal details unique to this invention.
Figure 4:
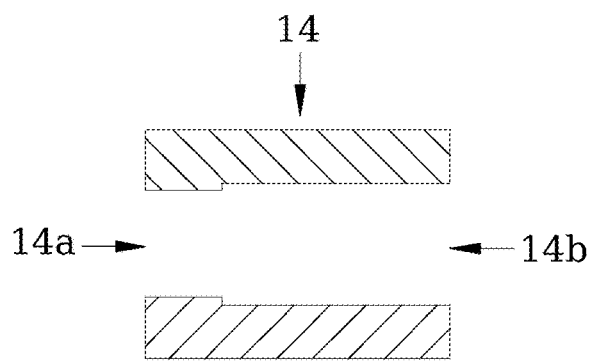
FIG. 4 illustrates the preferred embodiment of the twin bore gauge (14), a cylinder with two concentric bores of differing diameters (14a and 14b) in either end that meet somewhere in the middle but off-center.

Disclosed is a novel set of gauges and a unique method of taking critical measurements of rifle chambers and ammunition cartridges that have not previously been possible. The objective of this invention is better control of bullet jump by providing a means for measuring a chamber's freebore and a novel means for measuring bullet seating depth, bullet jump being the difference between these two measurements. Measuring freebore requires determining with precision the distance between the shoulder datum of the chamber (6a) and the ramp (3c); this is accomplished with a twin probe gauge ((7) through (13)) and is illustrated in FIG. 3. The twin bore gauge (14) of FIG. 4 is then used with a machinist's caliper (19) to measure an ammunition cartridge ((2) and (4)) in a novel way, illustrated in FIGS. 6a and 6b, to determine the bullet seating depth. The details are discussed below.

The preferred embodiment of the twin probe gauge ((7) through (13)), illustrated in FIG. 3, is designed to be used with rifles having a bolt type action where the bolt is readily removed to allow straight line access to the chamber (3a). The twin probe gauge ((7) through (13)) is used in the following manner:
1. Turn the micrometer head (7) to retract the inner probe (13) into the outer probe (12).
2. Insert the twin probe gauge into the chamber (3a) until the outer probe (12) is seated on the shoulder of the chamber (3b).
3. Turn the micrometer head (7) to extend the inner probe (13) until it is seated on the ramp (3c).
4. Remove the twin probe gauge from the chamber.

Figure 3A:
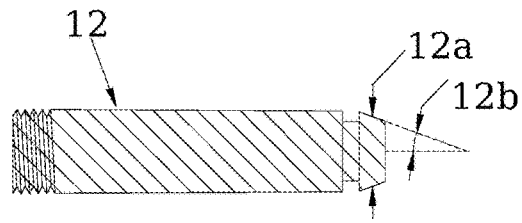
FIGS. 3a and 3b are enlarged views of the probes in FIG. 3, shown in profile view.
Figure 3B:
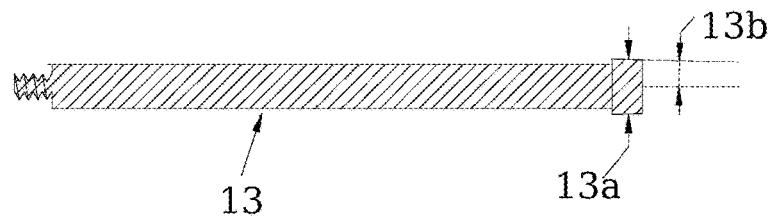

Rifles exist in a wide range of size and shape so the twin probe gauge ((7) through (13)) can be reconfigured to match the rifle. The probes are replaceable and will need to match the chamber. The tip of the outer probe (12) must have a median diameter (12a) and cone angle (12b) (see FIG. 3a) that matches the chamber shoulder (3b). The tip of the inner probe (13) must have a median diameter (13a) and cone angle (13b) (see FIG. 3b) that matches the ramp (3c). The length of the outer extension (8) and inner extension (9) can be changed. The outer extension (8) can be replaced with one that is rigidly curved (a bent tube) or flexible (similar to a control cable housing) and the inner extension (9) can be replaced with one that is made from wire or cable so that it is flexible.

The utility of the micrometer head (7) and base (10) will depend upon the configuration and application. In some configurations the micrometer head (7) will be calibrated to directly read freebore, in which case the base (10) can be eliminated and the probes ((12) and (13)) can be attached directly to the extensions ((8) and (9)). In other configurations that calibration will not exist so it may be preferable to remove the micrometer head (7) and replace the extensions ((8) and (9)) with the handles ((8a) and (9a)) illustrated in FIG. 7, in which case the outer handle (8a) is used to seat the outer probe (12) on the chamber's shoulder (3b) and the inner handle (9a) is used to seat the inner probe (13) on the ramp (3c) and then the set screw (11) in the base (10) is tightened to lock the position of the inner probe (13) relative to the outer probe (12). The base (10) will also be needed for those configurations where the micrometer head (7) is uncalibrated and long extensions ((8) and (9)) are in use.

For those configurations where freebore can not be directly read from the micrometer head (7) it must be determined in a different way. For most of these configurations it will be convenient to remove the micrometer head (7) and extensions ((8) and (9)) or handles ((8a) and (9a)), leaving only the base (10), outer probe (12), and inner probe (13) with the set screw (11) preserving the position of the inner probe (13) relative to the outer probe (12). Freebore is then determined by measuring the distance between the median diameter of the outer probe (12a) and the median diameter of the inner probe (13a) by using the twin bore gauge (14) in the same way that it is used to measure a cartridge (which is described below) with either a machinist's dial gauge or caliper.

The preferred embodiment of the twin bore gauge (14) illustrated in FIG. 4 is simply a metallic cylinder with two concentric bores of differing diameters in either end. The diameter of the smaller bore (14a) must match the median diameter of the inner probe (13a) (which matches the bore diameter (6c) at the end of the ramp (3c)) and the diameter of the larger bore (14b) must match the median diameter of the outer probe (12a) (which matches the chamber's shoulder datum diameter (6a)). The outer dimensions of the twin bore gauge (14) are not important so long as the surfaces around the bores ((14a) and (14b)) are flat and parallel. The bores ((14a) and (14b)) do not need to be concentric nor on opposite sides of the gauge but they do need to be in the same block of material with flat parallel sides so that the length of the gauge remains a constant. The depth of the larger bore (14b) must be longer than the distance between the probe tips. The gauge could also have more than one pair of twin bores.

Figures 5A, 5B:
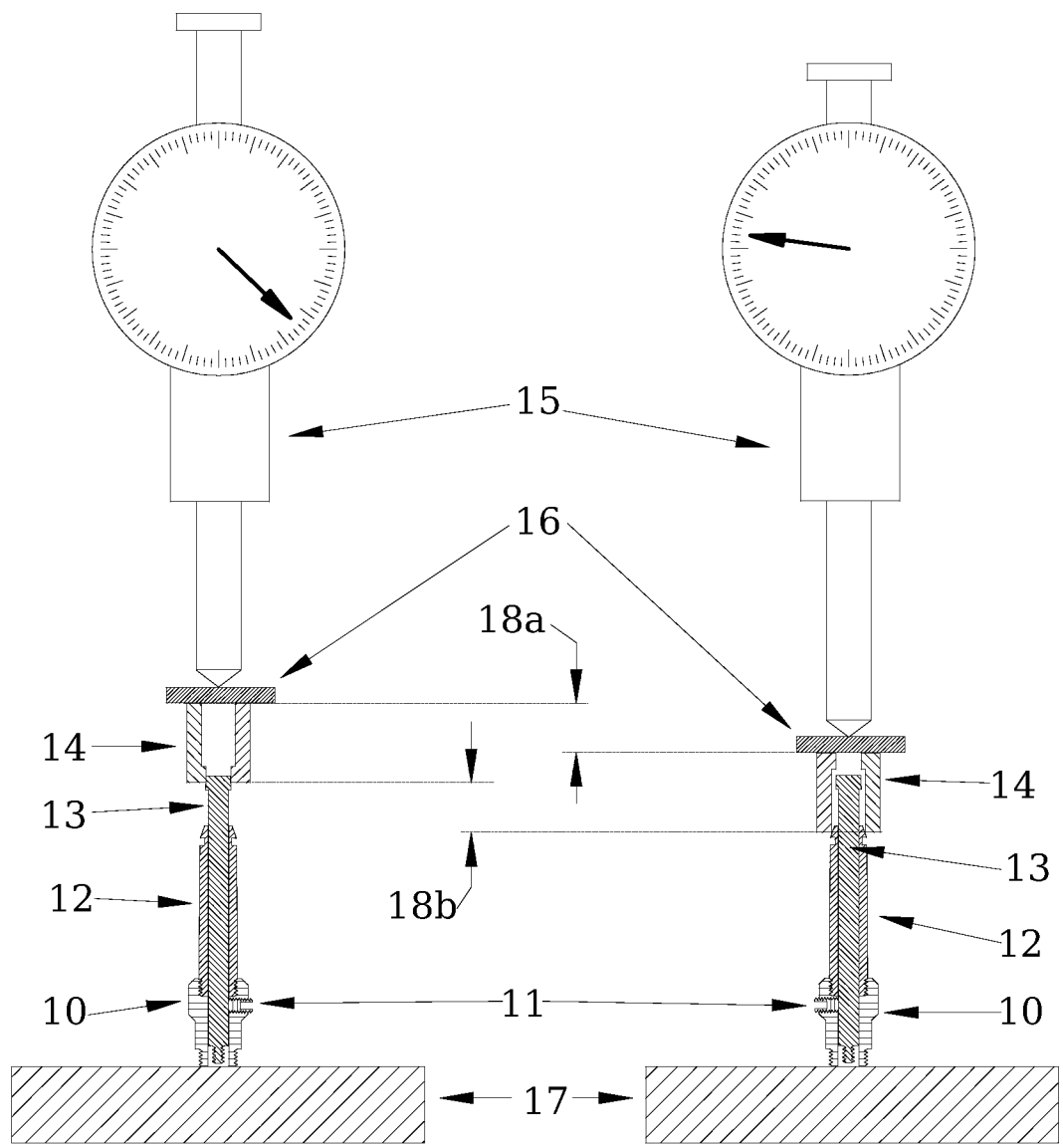
FIGS. 5a and 5b illustrate the method discussed below of using the twin bore gauge (14) and a machinist's dial gauge (15) to measure part of the twin probe gauge (10-13). The only difference between the two drawings are the orientation of the twin bore gauge (14) and the associated changes in the dial gauge (15).

The option of using a dial gauge to measure the twin probe gauge with the twin bore gauge is illustrated in FIGS. 5a and 5b. The measurement system includes a machinist's dial gauge (15), a spacer (16), and a platen (17); for clarity the means of rigidly suspending the dial gauge (15) above the platen (17) is omitted from the drawing (a multitude of means are commonly employed). The twin probe gauge has been partially disassembled as described above, leaving the base (10), outer probe (12), inner probe (13), with the set screw (11) locking the probes together. FIG. 5a illustrates the first step in the measurement process: the base (10) is set on the platen (17) under the dial gauge (15), the twin bore gauge (14) is placed small bore (14a) down onto the inner probe (13), and then the spacer (16) is placed between the twin bore gauge (14) and the probe of the dial gauge (15). The reading on the dial gauge is then noted. FIG. 5b illustrates the second step of the measurement process: the twin bore gauge (14) is flipped over and placed large bore (14b) down onto the tip of the outer probe (12); everything else is the same as FIG. 5a. The reading on the dial gauge is again noted. The difference between these two measurements is the change in position of the upper surface of the twin bore gauge (14), which is shown as item (18a). Because the length of the twin bore gauge is a constant, the difference between the two measurements is also the change in position of the bottom surface, which is controlled by where the twin bore gauge (14) contacts the two probes, which is shown as item (18b). Because the two bores ((14a) and (14b)) of the twin bore gauge (14) are sized to match the probe tips, the difference between the two readings (18b) is the distance between the median diameter of the outer probe (12a) and the median diameter of the inner probe (13a). Therefore, the difference between the two measurements is the freebore value.

The unique twin bores and the parallel flat ends of the twin bore gauge (14) are important features of this invention that increase ease of use and accuracy. If two single bore gauges are used then the individual length of each gauge must be taken into consideration when calculating the difference between the two measurements of the twin probe gauge. Therefore, the individual bore gauges would need to also be measured and any error in those measurements will contribute to the overall measurement error. By using the same twin bore gauge to take the two measurements of the twin probe gauge the length of the twin bore gauge is the same for both measurements. Therefore the length of the twin bore gauge does not contribute to the difference in the two measurements of the twin probe gauge and so that length can be ignored. Therefore two measurements are eliminated, increasing convenience, and two sources of measurement error are eliminated, increasing accuracy.

Figure 6A:
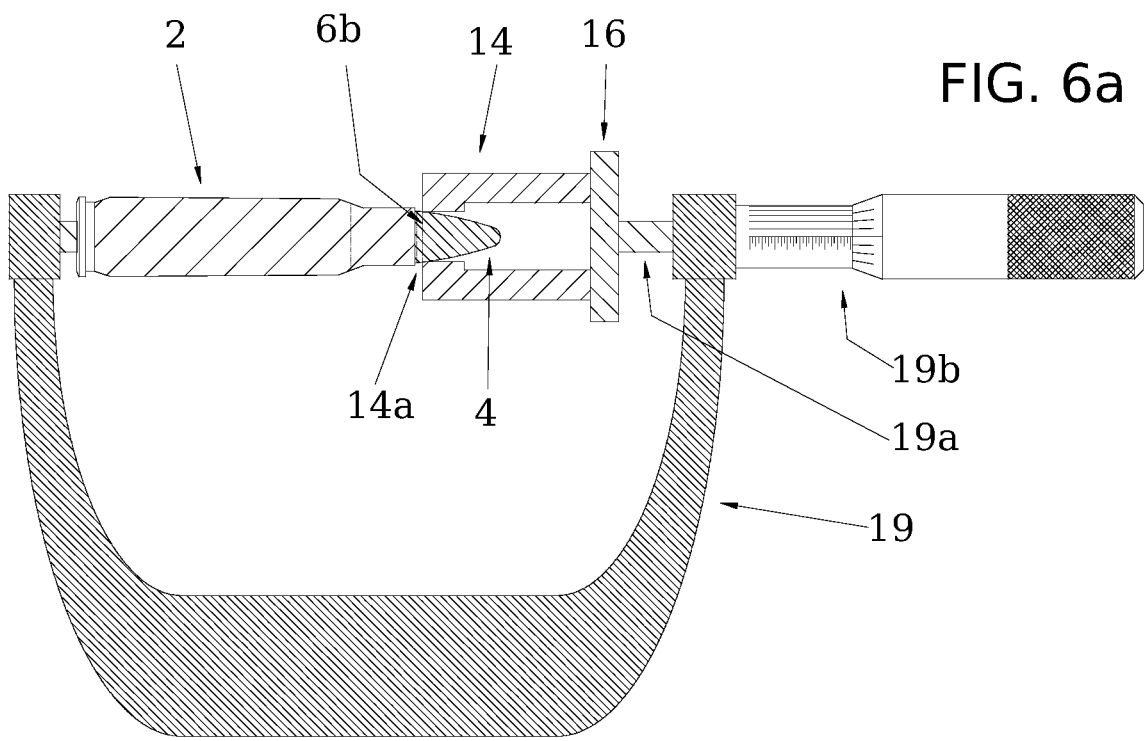
FIGS. 6a and 6b illustrate the method discussed below of using the twin bore gauge (14) and a machinist's calipers (19) to measure a cartridge. Again, the only difference between the two drawings are the orientation of the twin bore gauge (14) and the associated changes in the caliper probe (19a) and micrometer head (19b).
Figure 6B:
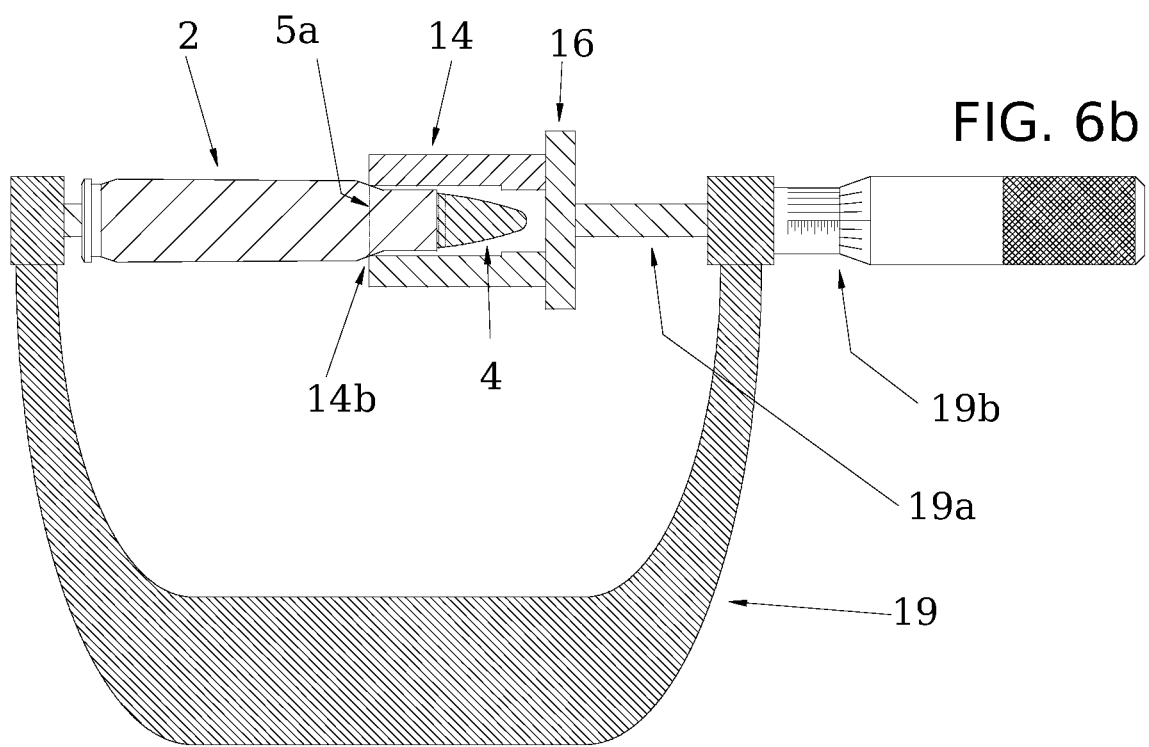

Once freebore has been determined the next step in determining bullet jump is measuring the seating depth of the bullet (4) in a unique manner. This invention measures the bullet seating depth as the distance between the case shoulder datum (5a) and the bullet datum (5c). This is done with the very same twin bore gauge (14) that was used above to determine freebore because the smaller bore (14a) has the same diameter as the bullet datum (5c) and the larger bore (14b) has the same diameter as the shoulder datum (5a). The twin bore gauge (14) is used to measure the seating depth of the bullet (4) in the case (2) the same way that it was used to measure the twin probe gauge previously. As stated above that measurement could have been made with calipers or a dial gauge but the dial gauge (15) was chosen for the illustration (FIGS. 5a and 5b). Measuring the cartridge ((2) and (4)) with the twin bore gauge (14) can also be done with either a caliper or a dial gauge; a caliper (19) is illustrated in FIGS. 6a and 6b. As before two measurements are taken with the only difference being the orientation of the twin bore gauge. In FIG. 6a the smaller of the twin bores (14a) lands on the bullet (4) at the bullet datum (6b); in FIG. 6b the orientation of the twin bore gauge (14) is changed and the larger of the twin bores (14b) lands on the case (2) at the shoulder datum (5a). The difference between these two measurements is the distance between the shoulder datum (5a) and the bullet datum (5c), which is the bullet depth.

Freebore is the distance from the chamber shoulder datum (6a) to the end of the ramp (6c). Bullet depth is the distance from the case shoulder datum (5a) to the bullet datum (5c). Therefore, the difference between freebore and bullet depth is the distance from the bullet datum (5c) to the end of the ramp (6c), which is bullet jump. Determining bullet jump is the primary purpose of this invention.

Figure 7:
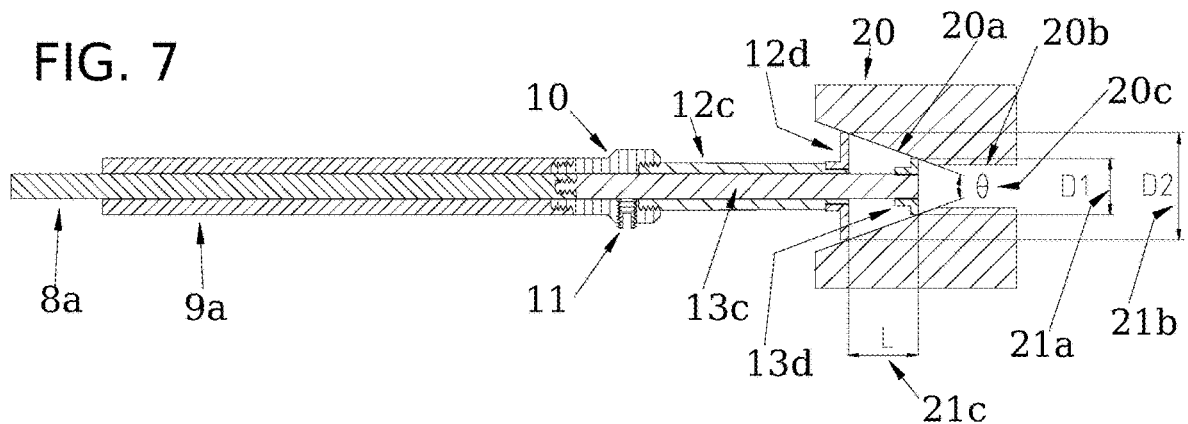
FIG. 7 illustrates alternative embodiments of the twin probe gauge (8a-13d) and how it can be used to measure the cone angle of an internal conical surface.

FIG. 7 presents several alternatives to the preferred embodiment illustrated in FIG. 3. The elements presented in FIGS. 3 and 7 can be mixed together as desired. As discussed above the micrometer head (7) will not always be useful so it can be removed, the inner extension (8) and the outer extension (9) are then removed, and then an inner handle (8a) and outer handle (9a) are installed. The length and shape of the handles will vary to match different rifles; the outer handle (9a) may be a bent tube or flexible housing in which case the inner handle (8a) would need to be made of cable or wire to achieve flexibility. Also illustrated in FIG. 7 are modular probes with tips formed as discs instead of cones. The outer probe now has a separate stem (12c) and tip (12d); the inner probe also has a separate stem (13c) and tip (13d), the tips being threaded on and easily replaced, the diameters being chosen to match the application. Being discs there is no shoulder angle to match. With disc tips the distance between the probe faces (21c) can be directly measured without the twin bore gauge being needed. The tips can be mixed (one cone tip and one disc tip). Disc tips appear superior on paper but in practice the conical tips also have advantages (including a lack of worry that the disc edge will scratch the chamber). The modularity of the design allows the end user to choose the configuration that they prefer.

The discussion above was solely related to measuring rifle chambers and ammunition cartridges. The twin probe gauge and twin bore gauge (appropriately sized) can also be utilized to measure the cone angle of a conical surface, which is particularly difficult when it is a truncated cone. Various techniques have been developed to approach this problem but they are cumbersome. Properly reconfigured, the twin probe and twin bore gauges provide a more elegant solution.

The right side of FIG. 7 is not a rifle chamber but is a generic representation of some object (20) that has an internal conical surface (20a) that ends in another bore (20b) that has eliminated the apex of the cone. The parameter to be measured is the cone angle (20c) of the conical surface (20a). Lacking an apex, the height of the cone can not be determined. It's also extremely difficult to accurately determine the diameter of the circle formed by the interface of the conical surface with the outer surface of the object. The typical solution places a ball in the conical hole, then a series of measurements and calculations are used to determine the cone angle. FIG. 7 illustrates a better solution. Appropriately sized tips ((12d) and (13d)) are selected and then seated against the conical surface (20a), the set screw (11) is tightened, the gauge is removed, and then the distance between the faces of the tips (21c) is measured directly (the twin bore gauge is not needed). The equation of FIG. 8 is then used to determine the cone angle (20c), theta, from the diameter of the outer tip (21b), D2, the diameter of the inner tip (21a), D1, and the distance between the faces (21c), L. This naturally leads to an embodiment with the micrometer head (7) and fixed disc tips where the micrometer head is calibrated to directly read the cone angle (20c) formed by the tips, making the calculation in FIG. 8 unnecessary.

Figure 9:
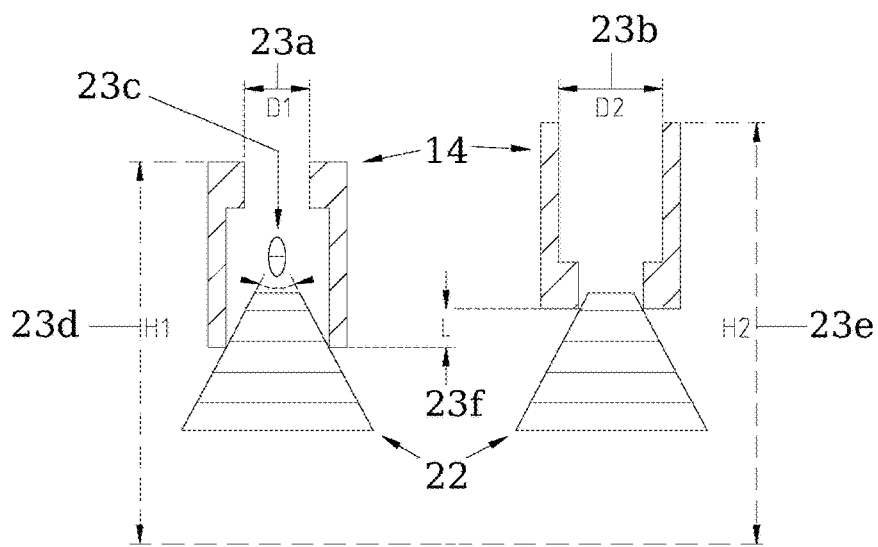
FIG. 9 illustrates using a twin bore gauge (14) to measure the cone angle of an external conical surface.

FIG. 9 illustrates the twin bore gauge (14) being used to measure the cone angle (23c), theta, of some external conical surface (22). As before, two measurements are required with the twin bore gauge (14) being inverted between measurements. With the larger bore seated on the conical surface the distance from the end of the gauge to some reference point is taken (23d), then the gauge (14) is inverted and another measurement is taken from the end of the gauge to the same reference point (23e). The equation of FIG. 10 is then applied; the first measurement, H1 (23d), is subtracted from the second, H2 (23e), to get the value for L (23f). The equation of FIG. 8 is then applied to get the value for theta, the cone angle (23c) with the diameter of the smaller bore (23a) being D1, the diameter of the larger bore (23b) being D2, and the distance between gauge surfaces between the two measurements (23f) being L as calculated from the equation of FIG. 10.

Figure 11:
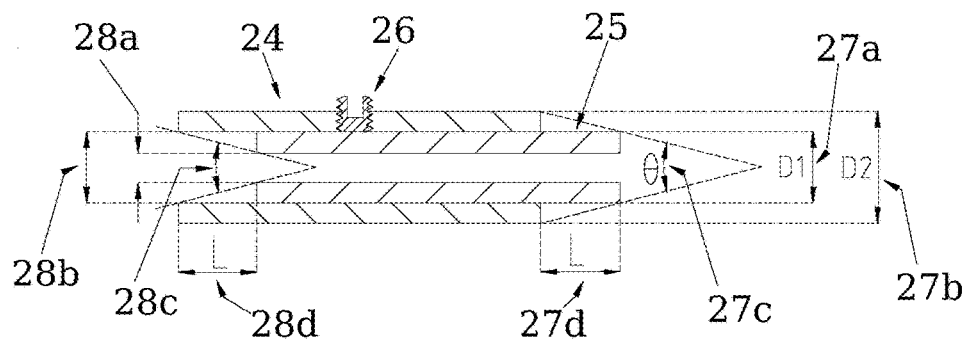
FIG. 11 illustrates an alternative embodiment of the twin bore gauge and how it can be used to measure the cone angle of both internal and external conical surfaces.

An alternate embodiment of the twin bore gauge is the twin bushing gauge illustrated in FIG. 11. An outer bushing (24) houses an inner bushing (25), a slip fit between them, both being the same length, with a set screw (26) in the outer bushing to secure the inner bushing. The bushings are simple cylinders; the diameter and wall thickness will vary considerably in order to match the diameter and angle of the conical surface being measured.

The right side of FIG. 11 illustrates how the twin bushing gauge can used to measure an internal conical feature. The outer bushing (24) and inner bushing (25) are seated against the surface, the set screw (26) is tightened, and then the distance between the ends (27d) is measured. The equation of FIG. 8 is then applied to find theta, the cone angle (27c), from D1, the outer diameter (27a) of the inner bushing (25), D2, the outer diameter (27b) of the outer bushing (24), and L, the distance between the ends of the bushings (27d).

The left side of FIG. 11 illustrates how the twin bushing gauge can be used to measure an external conical feature. The outer bushing (24) and inner bushing (25) are seated against the surface, the set screw (26) is tightened, and then the distance between the ends (28d) is measured. The equation of FIG. 8 is then applied to find the cone angle (28c), from D1, which is now the inner diameter (28a) of the inner bushing (25), D2, now the inner diameter (28b) of the outer bushing (24), and L, the distance between the ends of the bushings (28d).

This leads to another embodiment of the twin probe gauge of FIG. 7. Cylindrical probe tips enable the twin probe gauge to measure external conical surfaces as well. By including a properly calibrated micrometer head (7) the cone angle can be read directly.

I claim:

1. An instrument for measuring the distance between internal features of a rifle,
    said rifle comprising a barrel,
        said barrel comprising a chamber and a bore,
            said chamber comprising a conical shoulder,
                said shoulder having a median diameter and a cone angle,
            said bore comprising rifling grooves,
                said bore having a diameter,
                said rifling grooves having a diameter,
                said diameter of said rifling grooves being larger than said diameter of said bore,
                said rifling grooves comprising a ramp,
    said internal features including the group consisting of said median diameter of said shoulder and said ramp of said rifling grooves,
said instrument comprising:
an outer-probe,
    said outer-probe comprising a body and a tip,
        said tip of said outer-probe being incorporated into, fixedly attached, or removably attached to said body of said outer-probe,
        said body of said outer-probe comprising a bore,
        said tip of said outer-probe comprising a bore,
        said tip of said outer-probe being one of the group consisting of a cylindrical-tip or a conical-tip,
            said cylindrical-tip of said outer-probe having a diameter,
                said diameter of said cylindrical-tip of said outer-probe being equal to said median diameter of said shoulder,
            said conical-tip of said outer-probe having a median diameter and a cone angle,
                said median diameter of said conical-tip of said outer-probe being equal to said median diameter of said shoulder,
                said cone angle of said conical-tip of said outer-probe being equal to said cone angle of said shoulder;
and an inner-probe,
    said inner-probe comprising a body and a tip,
        said tip of said inner-probe being incorporated into, fixedly attached, or removably attached to said body of said inner-probe,
        said body of said inner-probe being within said bore of said outer-probe,
        said tip of said inner-probe protruding from said bore of said tip of said outer-probe,
        said tip of said inner-probe being one of the group consisting of a cylindrical-tip or a conical-tip,
            said cylindrical-tip of said inner-probe having a diameter,
                said diameter of said cylindrical-tip of said inner-probe being larger than or equal to said diameter of said bore of said barrel and smaller than or equal to said diameter of said rifling grooves,
            said conical-tip of said inner-probe having a maximum diameter,
                said maximum diameter of said conical-tip of said inner-probe being larger than or equal to said diameter of said bore of said barrel and smaller than or equal to said diameter of said rifling grooves.

2. An instrument for measuring an ammunition cartridge, said ammunition cartridge being for a rifle,
    said rifle comprising a barrel,
        said barrel comprising a chamber and a bore,
            said chamber of said barrel comprising a conical shoulder,
                said shoulder having a median diameter and a cone angle,
            said bore of said barrel having a diameter,
            said bore of said barrel comprising rifling grooves,
                said rifling grooves having a diameter,
                said diameter of said rifling grooves being larger than said diameter of said bore of said barrel,
said instrument comprising:
a primary-probe,
    said primary-probe comprising a flat surface,
    said primary-probe further comprising a bore intersecting said flat surface of said primary-probe,
        said bore of said primary-probe having a diameter, said diameter of said bore of said flat surface of said primary-probe being equal to said median diameter of said shoulder of said chamber;

and a secondary-probe, said secondary-probe comprising a flat surface, said secondary-probe further comprising a bore intersecting said flat surface of said secondary-probe, said bore of said secondary-probe having a diameter, said diameter of said bore of said secondary-probe being larger than or equal to said diameter of said bore of said barrel and smaller than or equal to said diameter of said rifling grooves;

said flat surface of said primary-probe being parallel to said flat surface of said secondary-probe.

3. An instrument for measuring the cone angle of a conical surface, said instrument comprising:

an outer-probe, said outer-probe comprising a body and a tip, said tip of said outer-probe being incorporated into, fixedly attached, or removably attached to said body of said outer-probe, said body of said outer-probe comprising a bore, said tip of said outer-probe comprising a bore, said tip of said outer-probe having a circular cross section;

and an inner-probe, said inner-probe comprising a body and a tip, said tip of said inner-probe being incorporated into, fixedly attached, or removably attached to said body of said inner-probe, said body of said inner-probe being within said bore of said body of said outer-probe, said tip of said inner-probe having a circular cross section.

* * * * *